United States Patent Office 3,193,571
Patented July 6, 1965

3,193,571
REACTION PRODUCTS OF POLYMERIC PHOSPHONITRILE CHLORIDES WITH AMMONIA AND METHANOL
Xavier François Bilger, Soisy-sous-Montmorency, France, assignor to Etablissements Kuhlmann, Paris, France
No Drawing. Filed Mar. 26, 1963, Ser. No. 267,914
Claims priority, application France, Mar. 30, 1962, 892,879
11 Claims. (Cl. 260—461)

The present invention concerns new phosphorus compounds.

A process for the preparation of phosphorus compounds and their application to the flameproofing cellulosic fibres has been described in French Patent 1,157,097. The method of preparation consists in treating with ammonia an intermediate compound of phosphorus of the empirical formula:

$$P_nN_{(n-1)}Cl_{(2n+3)}$$

in the presence of an inert solvent. For their application, the amino derivatives so obtained must be made into an aqueous solution by heating in presence of water.

This last operation constitutes a disadvantage in the sense that it is accompanied by hydrolysis; this results in irregularities in the flameproofing effect obtained on the treated fabrics.

In U.S. Patent No. 3,012,908 there is described a method of preparation of new phosphorus compounds which consists in reacting an intermediate compound of empirical formula $P_nN_{(n-1)}Cl_{(2n+3)}$ first with methanol and then with ammonia. The new compounds thus obtained have the advantage over compounds of the French patent of being immediately soluble in water and of conferring superior flameproofing qualities on cellulosic fibres.

It has now been found that it is possible to prepare from intermediate products of empirical formula $$P_nN_{(n-1)}Cl_{(2n+3)}$$

wherein $n$ is at least equal to 2 or mixtures thereof with polymeric phosphonitrile chlorides, products of which the flameproofing power with respect to cellulosic materials is improved by proceeding in the following manner: Instead of acting on the products of empirical formula $P_nN_{(n-1)}Cl_{(2n+3)}$ first with methanol and then with ammonia, these products are reacted in the presence of an inert solvent first with ammonia, possibly in the presence of methanol, and then with methanol while fresh quantities of ammonia or methanol may possibly be added later.

The intermediate products of empirical formula $$P_nN_{(n-1)}Cl_{(2n+3)}$$

or technical mixtures thereof with phosphonitrile chlorides may be obtained by known processes, for instance by those described in French Patent No. 1,157,097 or in U.S. Patent No. 3,012,908.

The solvents which may be used in the present process are those giving no reaction with the intermediate derivatives $P_nN_{(n-1)}Cl_{(2n+3)}$. Among these may be mentioned for example, tetrachlorethane, trichlorethylene, carbon tetrachloride, benzene, toluene and chlorobenzene.

The temperature at which the ammonia and methanol are reacted with the derivatives $P_nN_{(n-1)}Cl_{(2n+3)}$ is between —10° C. and 50° C.; for example, a limited amount of ammonia may be reacted at first, then the methanol and then a fresh amount of ammonia, or the ammonia and the methanol may be simultaneously introduced.

When the invention is carried out by successive introductions of ammonia, methanol and ammonia, the limited amount of gaseous ammonia brought into the first stage of the reaction with the intermediate derivatives $$P_nN_{(n-1)}Cl_{(2n+3)}$$

may vary widely. The quantities used are preferably between 0.05 and 0.5 molecule of gaseous ammonia per atom of chlorine contained in the intermediate phosphorus derivatives of the formula $P_nN_{(n-1)}Cl_{(2n+3)}$ or in the mixtures of these derivatives with polymeric phosphonitrile chlorides. During this reaction the atoms of chlorine of the above intermediate derivatives are partially substituted by $NH_2$ groups with the formation of ammonium chloride. The quantities of methanol introduced in the second stage of the reaction are advantageously between 0.5 and 4 molecules of methanol per atom of chlorine contained in the intermediate derivatives $$P_nN_{(n-1)}Cl_{(2n+3)}$$

or in the mixtures of these derivatives with polymeric phosphonitrile chlorides initially used. The complementary amount of ammonia used in the third stage of the reaction is that which is necessary to obtain a reaction product having, in aqueous solution a pH between 4 and 8.

When the invention is carried out by simultaneous introduction of methanol and ammonia, their supply is adjusted so that when the reaction product has, in aqueous solution, a pH between 4 and 8, at least 0.5 molecule of methanol per atom of chlorine contained in the intermediate product $P_nN_{(n-1)}Cl_{(2n+3)}$ or in the mixtures of this product with polymeric phosphonitrile chlorides has been introduced.

According to the amounts of methanol introduced and according to the amounts of inert solvent used, the flameproofing product is found in solution in the liquid phase or precipitated with the ammonium chloride formed during the reaction. In the first case, it is sufficient to filter and evaporate the organic solution in order to isolate the flameproofing product; in the second case, filtration of the reaction mass gives a mixture of ammonium chloride and the flameproofing product which may be separated, for example, by extraction with methanol.

The end products obtained are soluble in water and can be supplied commercially in concentrated aqueous solution. They can be used for flameproofing cellulosic materials by means of, for example, the processes described in the U.S. Patent No. 3,012,908.

The examples below, in which the parts are parts by weight, illustrate the invention without limiting it.

Example 1

456 parts of the crude product obtained according to Example 2 of the above-mentioned patent application filed *today*, are introduced into a reactor provided with a stirring means, and are cooled to 0° C. by means of a bath of ice and salt. 20 parts of dry gaseous ammonia are introduced while the temperature is maintained below 20° C. and the mixture is then stirred for a quarter of an hour. 200 parts of anhydrous methanol are then added, still under the same temperature conditions by external cooling. After having stirred for 3 hours, 70 parts of gaseous ammonia are introduced, the temperature of the reaction mixture being maintained at between 25° C. and 40° C. After a further half hour's stirring, a sample of 1 ml. of the reaction mixture is withdrawn. When stirred with 5 mls. of distilled water and then heated on a water bath at 95° C. for 5 minutes, it gives an aqueous phase with a pH of 5.1. Stirring is then continued for 10 to 15 hours. 740 parts are then obtained of a mixture comprising the reaction product in solution and ammonium chloride in suspension. It is filtered through calico and the filtration residue is washed with a mixture of 80 parts of methanol and 55 parts of chlorobenzene. 514 parts of filtrate (including washings) and 348 parts of drained ammonium chloride, that is 258 parts of dry ammonium chloride are obtained. The solvents in the filtrates are removed by distillation and the residue is dissolved in 40 parts of water. 205 parts of a viscous liquid are thus obtained. When applied to cotton fabric according to the processes described in Examples 7 and 8 of U.S. Patent No. 3,012,908, this product gives better flameproofing effects at the same concentrations or the same flameproofing effects at lower concentrations.

Example 2

The orange liquid, obtained by the process described in paragraph A of Example 2 of U.S. Patent No. 3,012,908, is treated with 80 parts of tetrachlorethane and cooled to 0° C. Operating as in Example 1 above, 15 parts of gaseous ammonia, then 200 parts of methanol and again 75 parts of gaseous ammonia, are introduced.

Still following the operational method of Example 1 above, about 200 parts of a thick liquid are finally obtained. The flameproofing power of this product is comparable with that of the product of Example 1 above.

Example 3

A. 417 parts of phosphorus pentachloride are condensed with 87.5 parts of ammonium chloride in the presence of chlorobenzene as a solvent.

482 parts of crude reaction product are obtained containing 32% of derivatives insoluble in petrol ether corresponding to the empirical formula $P_{4.85}N_{3.85}Cl_{12.7}$ and 20% of trimeric and tetrameric phosphonitrile chloride.

B. 330 parts of chlorobenzene are added to the 482 parts of reaction product prepared as in A, and the mixture is cooled to 0° C. It is allowed to absorb 10 parts of gaseous ammonia in two hours without exceeding a temperature of 15° C., then 112 parts of anhydrous methanol are run in. The reaction mixture is then treated again with ammonia (97 parts) while allowing the mixture to warm up to a temperature of 25 to 35° C. It is cooled and stirred for 12 hours at room temperature. 485 parts of liquid and 1020 parts of a white residue are separated by filtration.

The residue, containing ammonium chloride and phosphorus derivatives, is suspended in 320 parts of methanol and stirred for 4 hours. The insoluble ammonium chloride is removed by filtration and washed with 200 parts of a mixture of methanol and chlorobenzene in the proportions of 2 to 1.

660 parts of filtrate and 337 parts of drained ammonium chloride, that is 220 parts of dry ammonium chloride, are obtained. The solvents are evaporated from the filtrate and 53 parts of water are added to the residue.

227 parts of final product are obtained in the form of a viscous liquid.

The following contents have been found by analysis:

| | Percent |
|---|---|
| P | 22.7 |
| N | 21.7 |
| Cl (−) | 5.35 |

When applied to cotton fabric, this product leads to the same flameproofing effects as those observed with the product of Example 1 above.

Example 4

The method of operation is as in Example 3, using the same amounts of reagents, but in B the 112 parts of methanol are introduced without interrupting the introduction of gaseous ammonia, that is, the methanol and the 97 parts of ammonia are added simultaneously while maintaining the temperature between 15° C. and 20° C.

The final product thus obtained is similar to that of Example 3 above.

Example 5

The condensation product obtained in Example 3A is diluted with 330 parts of chlorobenzene. 17 parts of gaseous ammonia, then 80 parts of methanol and finally 82 parts of ammonia are added over a period of 2 hours and without exceeding a temperature of 25° C. in the mass. The subsequent procedure is as for Example 3B, but 40 parts of water are added to the residue after evaporation of the solvents. 189 parts of final product are then obtained which has the following contents on analysis:

| | Percent |
|---|---|
| P | 23.86 |
| N, total | 21.93 |
| Cl (−) | 6.5 |
| OCH$_3$ | 18.32 |
| C | 8.06 |
| H | 6.49 |

A cotton fabric treated in an aqueous bath containing 20% of the above product and 4% of urea so as to deposit 18% of crude product on the fabric, dried at 90 to 95° C., then heated at 150° C. for 5 minutes and rinsed, shows good flameproof qualities satisfying the test by the French standards (Decree of September 4th, 1951, Official Journal of October 9th, 1951, p. 10245). These flameproof qualities are retained even after 10 machine washes at 100° C. in a bath containing 5 grms. per litre of soap and 2 grms. per litre of sodium carbonate.

Example 6

The procedure is as for Example 5, but with the use of 17 parts of ammonia, 160 parts of methanol, 80 parts of ammonia and 40 parts of water. A final product is obtained containing:

| | Percent |
|---|---|
| P | 24.18 |
| N, total | 23.34 |
| Cl (−) | 6.32 |
| OCH$_3$ | 18.78 |
| C | 8.31 |
| H | 7.17 |

The procedure is as in Example 3, but with the following quantities of reagents:

A.

834 parts of phosphorus pentachloride
550 parts of chlorobenzene
193 parts of ammonium chloride obtained as a by-product in Example 2 of U.S. Patent No. 3,012,908.

1013 parts of an orange liquid are obtained containing 24.9% of product corresponding to the empirical formula: $P_{9.6}N_{8.6}Cl_{22.2}$ and 32.1% of polymeric phosphonitrile chloride.

Still following the operational procedure of Example 3 the following quantities are successively used:

B.

770 parts of chlorobenzene
48 parts of ammonia
250 parts of methanol
166 parts of ammonia
110 parts of water There are finally obtained 400 parts of an end product containing:

| | Percent |
|---|---|
| P | 23.22 |
| N, total | 21.52 |
| Cl (−) | 4.3 |

Example 8

The same quantities or reagents are used as for Example 3, but the 420 parts of product obtained according to Example 3A are converted as follows:

They are diluted with 440 parts of chlorobenzene and cooled to 0° C. Methanol and ammonia are then introduced simultaneously, their respective feeds being adjusted so that 112 parts of methanol and 60 parts of ammonia are introduced over a period of 4 hours. In the same time the temperature of the mass is allowed to rise progressively and regularly to 35° C. at which temperature a further 50 parts of ammonia are introduced. For the rest of the preparation, the operation is as indicated in Example 3, in order to obtain finally 230 parts of a viscous liquid similar to that obtained in Example 3.

We claim:

1. Process for the preparation of phosphorous compounds which comprises reacting products of the empirical formula $P_nN_{(n-1)}Cl_{(2n+3)}$ wherein $n$ is at least equal to 2, in the presence of inert solvent and at a temperature between $-10°$ C. and $+50°$ C., with ammonia and then with methanol.

2. Process according to claim 1 wherein the products of empirical formula $P_nN_{(n-1)}Cl_{(2n+3)}$ are reacted first with an initial quantity of ammonia, then with methanol and then with a further quantity of ammonia.

3. Process according to claim 1 wherein the products of empirical formula $P_nN_{(n-1)}Cl_{(2n+3)}$ are mixed with polymers of phosphonitrile chloride.

4. Process according to claim 3 wherein the products of empirical formula $P_nN_{(n-1)}Cl_{(2n+3)}$ are reacted first with an initial quantity of ammonia, then with methanol and finally with a further quantity of ammonia.

5. Process according to claim 3 wherein the products of empirical formula $P_nN_{(n-1)}Cl_{(2n+3)}$ are reacted simultaneously with ammonia and methanol.

6. Process according to claim 1 wherein the solvent is a member selected from the group consisting of tetrachlorethane, trichlorethylene, carbon tetrachloride, benzene, toluene and chlorobenzene.

7. Process according to claim 1 wherein the products of empirical formula $P_nN_{(n-1)}Cl_{(2n+3)}$ are reacted first with between 0.05 and 0.5 molecule of gaseous ammonia per atom of chlorine in the starting chlorides, then with between 0.5 and 4 molecules of methanol per atom of chlorine in the starting chlorides and then with sufficient ammonia to give a reaction product having, in aqueous solution, a pH between 4 and 8.

8. Process according to claim 7 wherein the compounds of formula $P_nN_{(n-1)}Cl_{(2n+3)}$ are mixed with polymeric phosphonitrile chlorides.

9. Process according to claim 1 wherein the products of empirical formula $P_nN_{(n-1)}Cl_{(2n+3)}$ are reacted simultaneously with ammonium and methanol, the supply of the ammonia and methanol being regulated so that when the reaction product has, in aqueous solution, a pH between 4 and 8, at least 0.5 molecule of methanol per atom of chlorine in the starting chlorides has been introduced.

10. Process according to claim 9 wherein the compounds of formula $P_nN_{(n-1)}Cl_{(2n+3)}$ are mixed with polymeric phosphonitrile chlorides.

11. Phosphorus compounds prepared by the process as claimed in claim 1.

References Cited by the Examiner
UNITED STATES PATENTS 3,012,908  12/61  Bilger _____ 260—461

CHARLES B. PARKER, *Primary Examiner.*